United States Patent [19]

Stella

[11] 4,298,098

[45] Nov. 3, 1981

[54] LUBE PLUG

[75] Inventor: Leo Stella, Bristol, Conn.

[73] Assignee: The Torrington Company, Torrington, Conn.

[21] Appl. No.: 87,949

[22] Filed: Oct. 25, 1979

[51] Int. Cl.³ .............................................. F01M 11/00
[52] U.S. Cl. ...................................... 184/105 B; 308/187
[58] Field of Search ................ 184/105 B, 105 C, 88, 184/94; 308/187, 187.1

[56] References Cited

U.S. PATENT DOCUMENTS

| | | | |
|---|---|---|---|
| 2,318,903 | 5/1943 | Thomas | 308/187 X |
| 2,856,025 | 10/1958 | Whited et al. | 184/105 B |
| 3,116,747 | 1/1964 | Cowles et al. | 184/105 B X |
| 3,504,952 | 4/1970 | Farmer | 308/6 R |
| 4,067,414 | 1/1978 | Funke | 184/105 B |
| 4,106,826 | 8/1978 | Marola et al. | 308/187 |
| 4,113,327 | 9/1978 | Koch | 308/187 X |

Primary Examiner—David H. Brown
Attorney, Agent, or Firm—Frank S. Troidl

[57] ABSTRACT

A plug with enough stiffness to normally remain in its original position but resilient enough to be moved by the application of lubricant pressure is located in the longitudinal bore of the inner member of a cam follower.

5 Claims, 6 Drawing Figures

LUBE PLUG

This invention relates to bearings. More particularly, this invention is a lube plug.

Some cam followers which have lubrication holes in the shaft are shipped with tiny sheet metal drawn cups to be used as a plug in the lubrication bore. This plug is used where no grease fitting is installed and is intended to keep contaminants out and to keep grease in. The plug is shipped loose and is to be installed in the cam follower lubrication hole by the user.

Other cam followers have a self-sealing lubrication inlet fitting at the end of the lubrication bore. The fitting always seals after each lubrication.

Loose sheet metal drawn cup plugs are often lost or misplaced and the buyer is stuck with cam followers which do not have a corresponding loose plug.

Self-sealing lubrication inlet fittings are relatively expensive, and the buyer must pay the cost even though it may never become necessary to relubricate the bearing.

This invention provides the buyer with a relatively inexpensive cam follower which has a plug already installed in the lubrication hole. If no further relubrication is done to the bearing, the hole remains plugged throughout the service of the bearing.

Briefly described, this invention includes an inner member and an outer member with a plurality of rolling members located in an annular space between the inner member and the outer member. The inner member has a longitudinal lubrication bore and a cross-hole extending radially from the longitudinal lubrication bore to the annular space. A plug means is located in the longitudinal lubrication bore to seal the lubricant. The plug means includes a plug having enough stiffness to normally remain in its original position but resilient enough to be moved from its original position by the application of lubrication pressure, if the customer decides to relubricate the bearing.

The invention, as well as its many advantages, may be further understood by reference to the following detailed description and drawings in which.

In the various figures, like parts are referred to by like numbers.

Figure 1:
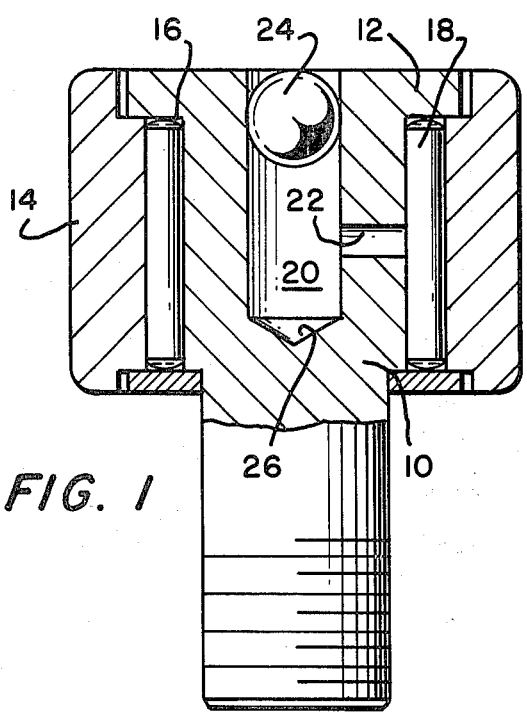
FIG. 1 is an elevational view, partly in section, showing a cam follower with one preferred embodiment of the new plug fitting.

Referring to the drawings and more particularly to FIG. 1, the cam follower includes an inner member 10 having an upper flange 12, and an outer member 14 of greater inside diameter than the outside diameter of the inner member 10, thus providing an annular space 16 in which a plurality of rolling members, such as needle rollers 18, are located.

A longitudinal lubrication bore 20 extends into the inner member 10 from the top of flange 12 partially through the inner member 10. A lubricating cross-hole 22 extends radially from the bore 20 to the annular space 16.

A plug means such as ball plug 24 is located at the entranceway to longitudinal bore 20. The plug 24 has enough stiffness to normally remain in its position shown in FIG. 1 but is resilient enough to be moved downwardly against the seat 26 when lubrication pressure is applied against the ball 24. The ball may be made of rubber or a plastic or any other type of material, provided the ball has the required stiffness to normally remain in its original position and the required resiliency to be moved along the bore and into the seat 26 when lubrication pressure is applied. The seat 26 formed by the end of bore 20 is longitudinally located within inner member 10 a sufficient distance past radial cross-hole 22 to permit the free flow of grease into annular space 16.

Figure 2:
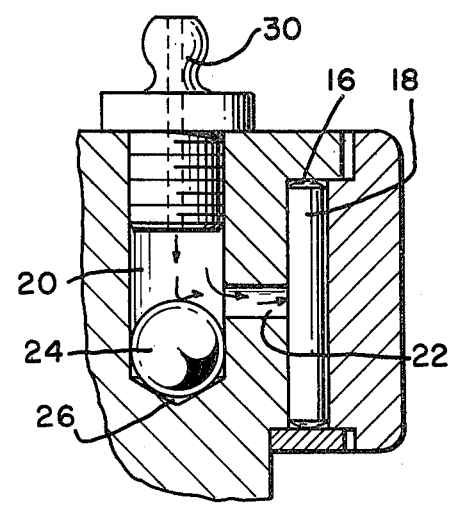
FIG. 2 is a fragmentary sectional view of the cam follower of FIG. 1 showing the position of the plug after the cam follower is relubricated.

If it is necessary to relubricate the cam follower, grease fitting 30 shown in FIG. 2 is inserted into the top of the longitudinal bore 20. The grease pressure will force the ball 24 against the seat 26 and the lubricant will flow along longitudinal bore 20, outwardly through radial cross-hole 22, and into the annular space 16. The ball 24 will never return to its original position.

Figure 3:
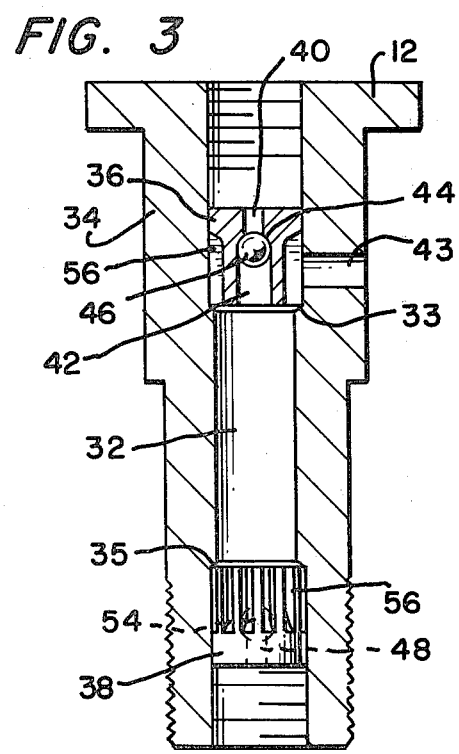
FIG. 3 is a sectional elevational view showing the inner member of a cam follower with a second preferred embodiment of plug means.
Figure 4:
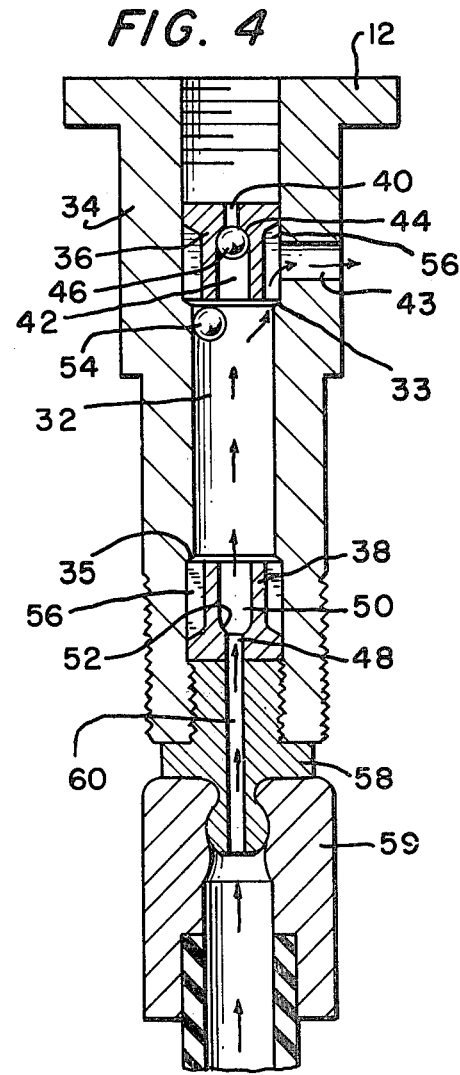
FIG. 4 is a sectional elevational view of the embodiment of FIG. 3 showing the positions of the plug means after relubrication.

In the case of larger size studs, the longitudinal bore in the inner member may extend entirely through the inner member. A larger size stud is shown in the embodiment of FIG. 3 and FIG. 4. The longitudinal lubrication bore 32 extends entirely through the inner member 34. The plug means includes plug fittings 36 and 38. Each of the plug fittings 36 and 38 are the same structure with plug fitting 36 containing a longitudinal bore extending therethrough which longitudinal bore includes a bore 40 extending downwardly from the top of fitting 36 and into a larger bore 42 thus providing a ball seat 44 for the ball plug 46. Similarly, plug fitting 38 includes a longitudinal bore extending therethrough consisting of a bore 48 (see FIG. 4) extending upwardly from the bottom of plug fitting 38 and into a larger diameter bore 50 thus providing a ball seat 52 for the ball plug 54.

The plug fittings 36 and 38 are press-fitted into the longitudinal bore 32 to desired locations. An upwardly facing shoulder 33 and a downwardly facing shoulder 35 may be provided in bore 32 to seat plug fittings 36 and 38, respectively. A portion of the plug fitting outside diameter is relieved by the provision of serrations 56 which provide stability and retention during the press-fitting. The balls 46 and 54 are sufficiently stiff to normally remain in their original position shown in FIG. 3, but resilient enough to be moved by the application of lubricant pressure.

If relubrication is necessary, the grease fitting 58, as shown in FIG. 4 is inserted into the bottom of the longitudinal bore 32. If desired, of course, the grease fitting could have been inserted into the top of the bore 32. Grease from the lube gun head 59 is fed through the bore 60 of the grease fitting 58. The hydraulic pressure forces the ball 54 from the seat 52. Ball 46 remains in position in plug fitting 36 because the diameter of bore 40 is less then the diameter of bore 42. The grease flows along longitudinal bore 32 and radially outwardly through cross-hole 43 and into the space containing the needle rollers.

Figure 5:
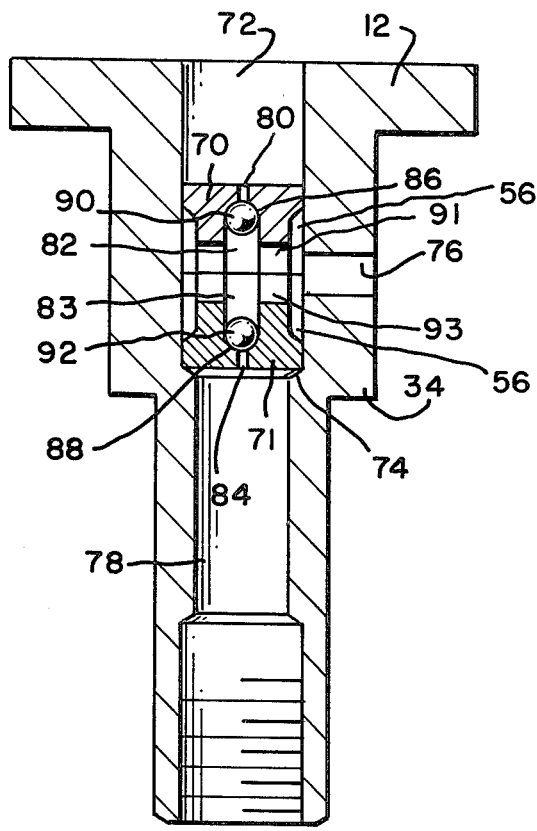
FIG. 5 is a sectional elevational view showing still another preferred embodiment of the invention.
Figure 6:
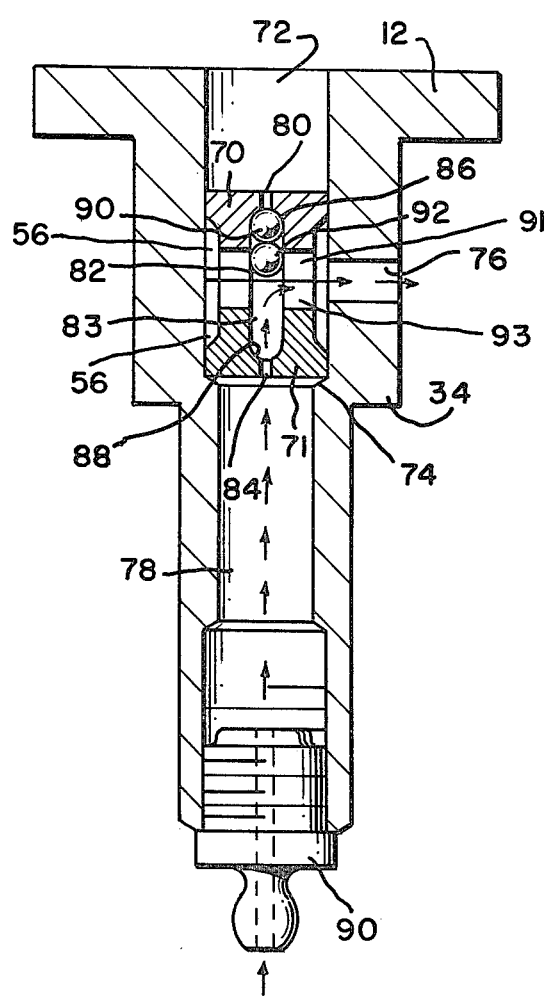
FIG. 6 is a view similar to FIG. 5 showing the position of the plug means after relubrication.

In the embodiment of FIG. 5 and FIG. 6, two plug fittings 70 and 71 are shown inserted into a larger diameter bore 72 extending from the top of inner member 34. The plug fitting 71 seats against a shoulder 74 located below the cross-hole 76. The shoulder 74 is provided by a smaller diameter bore 78 extending from the bottom of the inner member 34 to the bottom of larger diameter bore 72. The bottom of plug fitting 70 engages the top of plug fitting 71.

The plug fittings 70 and 71 have bores including a bore 80 extending from the top of the plug fitting 70, and larger bores 82 in fitting 70 and 83 in fitting 71 extending from bore 80 to a smaller bore 84 in plug 71 which extends to the bottom of the plug 71. Thus, ball seats 86 and 88 are provided for balls 90 and 92, respectively. Access slots, 91 and 93, extend to the serrated outside of plug fittings 70 and 71. The access slots must be small enough to prevent the balls from passing into the cross hole 76.

In the embodiment of FIG. 5 and FIG. 6, the cam follower may be lubricated from either end. In FIG. 6, the cam follower is being relubricated by the insertion of a grease fitting 90 into the bottom of the lubricating bore. The grease hydraulic pressure unseats valve 92 and the lubrication flows from longitudinal lubrication hole 78 through bores 84 and 83, access slots, 91 and 93, and cross-hole 76 into the annular space containing the needle rollers.

I claim:

1. In a cam follower containing lubricant: an inner member; an outer member of greater inside diameter than the outside diameter of the inner member thus providing an annular space between the inner member and the outer member; a plurality of rolling members in the annular space, said inner member having a longitudinal lubrication bore and a cross-hole extending radially from the longitudinal lubrication bore to the annular space; and plug means in the longitudinal bore located to seal the lubricant; said plug means including a plug having enough stiffness to normally remain in its original position but resilient enough to be moved from its original position by the application of lubricant pressure.

2. A cam follower in accordance with claim 1 wherein: the longitudinal lubrication bore extends partially through the inner member and the plug means is a ball.

3. A cam follower in accordance with Claim 1 wherein: the lubrication bore extends entirely through the inner member and the plug means includes two plug fittings, each having a longitudinal bore extending therethrough and a ball in such longitudinal bore adjacent each end of the longitudinal bore.

4. A cam follower in accordance with claim 1 wherein: the longitudinal lubrication bore extends entirely through the inner member, and the plug means includes at least one plug fitting with a longitudinal bore extending therethrough and a ball located in said longitudinal bore.

5. A cam follower in accordance with claim 3 wherein: there are two plug fittings in the longitudinal lubrication bore, one plug fitting on each side of the cross hole with each plug fitting having a longitudinal bore extending therethrough and a ball in said longitudinal bore.

* * * * *